United States Patent Office 2,933,477
Patented Apr. 19, 1960

2,933,477

POLYURETHANE RESINS FROM LACTONE POLYESTERS

Fritz Hostettler, Charleston, W. Va., assignor to Union Carbide Corporation, a corporation of New York No Drawing. Application April 13, 1956
Serial No. 577,948

18 Claims. (Cl. 260—77.5)

This invention relates to resins derived from diisocyanate-modified polyesters, and to a method of preparing the same.

It has been proposed heretofore to prepare urethane resins by forming a polyester of a dicarboxylic acid and a diol, e.g., adipic acid and ethylene glycol; lengthening the chain by reacting the terminal active hydrogen of the polyester with a diisocyanate; reacting the resulting polyester-polyurethane diisocyanate with a bifunctional component such as water, glycol, amino alcohol or a diamine to obtain an intermediate gum product and finally subjecting the gum to a final cure by admixture of additional diisocyanate on a cold mill and molding at elevated temperature.

Certain of the polyester-polyurethane elastomers obtained in accordance with these prior art processes are superior to other elastomers such as natural rubber and several of the synthetic rubbers in having better tensile strengths, resistance to swelling in oils or organic solvents, resistance to permeability of gases and to the action of ozone and extraordinarily superior abrasion resistance. With these advantages, however the polyester-polyurethane elastomers heretofore suggested have several important disadvantages. One is that the intermediate gum stock and even the cured elastomer tend to harden on standing. Another is that the flexibility of the elastomers at low temperatures is inferior to that of natural rubber and therefore leaves much to be desired.

The tendency to harden on standing within a few months is associated with a crystallization of the polymer and represents a serious handicap to the further processing of gum stocks for various applications. It necessitates accurate control over the inventory of the gum stock and careful correlation of gum stock production with its use in the manufacture of articles of cured elastomer. Hardening of the gum stock limits the practicability of producing it in a central location and utilizing it in molding or otherwise forming cured elastomeric products therefrom at diversified locations. Hardening of the cured elastomer is, of course, objectionable because with a loss in flexibility, the elastomer loses its most distinguishing characteristic and in fact ceases to be an elastomer.

The inability of the heretofore proposed polyester-polyurethane elastomers to flex at low temperatures is important for numerous applications where low temperatures are or may be encountered. Whereas the brittle temperature of natural rubber is of the order of −60 to −70° C., the brittle temperature obtainable at this time with polyurethane elastomers averages only about −35° C. This imposes a very considerable limitation upon the uses to which the synthetic product may be applied.

The surprising discovery has now been made that polyester-polyurethane gum stocks and cured elastomers having a unique molecular structure derived from the initial use of one or more lactones in their preparation are remarkably superior to the polyester-polyurethane gum stocks and elastomers heretofore proposed in that they possess surprisingly low brittle temperatures and are non-hardening in both the gum stock and cured elastomeric forms.

The products of the invention are characterized by the presence of substantially linear series of interconnected groups composed of carbon, hydrogen and oxygen. Each series has a terminal carbonyl group at one end and a terminal oxy group at the other end. The terminal carbonyl groups of two series are linked by a bivalent organic radical by means of oxy or amino groups with the formation of ester or amide linkages and terminal oxy groups of the series are connected to carbonyl groups of isocyanates with the formation of urethane linkages. Each interconnected group in the series is an opened lactone residue comprising an oxy group at one end, a carbonyl group at the other end, and an intermediate chain of at least five carbon atoms. The groups are linked together end to end, i.e., terminal carbonyl group of one to the terminal oxy group of the next, to form a series of interconnected groups. Being derived at least in part from a lactone having at least seven carbon atoms, it follows that at least one of the groups in at least one of the series contains at least seven carbons.

In the preferred embodiment of the method of the invention, the gum stocks are prepared in three stages and, when required, are cured or converted into elastomers in a fourth stage. The first stage comprises reacting one or more lactones with a bifunctional initiator to prepare a polyester, a term used herein to include linear polycondensates, and blends thereof, having terminal hydroxyl groups and in which at least some of the interconnected lactone residues contain at least seven carbon atoms. The second stage comprises the substantially linear extension of the polyester by reaction with a diisocyanate. The third stage involves a controlled cross-linking of the linear polyester-polyurethane products for forming a gum stock, and the fourth stage is a final curing step for converting the gum stock into a tough elastomer.

While it is preferable to carry out these stages successively and more or less separately in order to achieve maximum control over the progress of the reactions and the characteristics of the final products, it is entirely possible and within the scope of the invention to combine several stages, e.g., the second and third, third and fourth, or second, third and fourth stages, to change their order, or to modify them, e.g., by admixing the polyester of the first stage with the cross-linking agent of the third stage before proceeding with the second stage.

FIRST STAGE

*(Polyester preparation)*

The preparation of a polyester in the first stage is carried out by reaction of a bifunctional initiator with one or more lactones having at least six carbon atoms in the ring. Such polyester formation is illustrated by the reaction of epsilon-methyl-epsilon-caprolactone with ethanolamine as represented in Equation I:

(I)

$$HO(CH_2)_2NH_2 + mO=C(CH_2)_4CHCH_3 \underset{\underline{\hspace{1cm}O\hspace{1cm}}}{=}$$

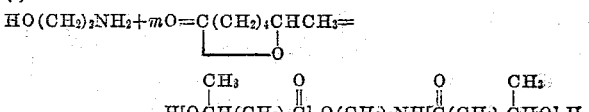

in which the sum of the $x$'s is equal to $m$.

It is believed that in Reaction I the active hydrogen atoms on the bifunctional initiator open the lactone rings and result in the transfer of the active hydrogen to the end of the opened lactone group, thereby becoming available for successively opening further lactone rings with the result that a readily controllable number of lactones can be condensed on a given bifunctional initiator without forming water of condensation.

The lactone used as a starting material in the preparation of the polyester may be any lactone containing at least seven carbon atoms, or any combination of lactones in which at least one contains at least seven carbon atoms. This includes lactones having six carbon atoms in the ring and at least one carbon in a substituent on the ring, substituted and unsubstituted lactones having seven or more carbon atoms in the ring, and combinations of any one or several such lactones with one another or with unsubstituted lactones having as few as six carbon atoms in the ring. The lactones that are useful are represented by the general formula:

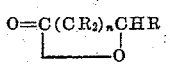

in which $n$ is at least four, at least $n+2$ R's are hydrogen, and the remaining R's are members selected from the group consisting of hydrogen, alkyl, cycloalkyl, alkoxy and single ring aromatic hydrocarbon radicals. Lactones having greater numbers of substituents other than hydrogen on the ring, and lactones having five or less carbon atoms in the ring, are considered unsuitable for the purposes of the invention because of the tendency that polymers thereof have to revert to the monomer, particularly at elevated temperature.

The lactones preferred in this invention are the epsilon-caprolactones having the general formula:

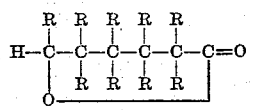

wherein at least six of the R's are hydrogen and the remainder are hydrogen, straight or branched chain alkyl, cycloalkyl, alkoxy or single ring aromatic hydrocarbon radicals, none of the substituents contain more than about twelve carbon atoms, and the total number of carbon atoms in the substituents on a lactone ring does not exceed about twelve. Unsubstituted epsilon-caprolactone, in which all the R's are hydrogen, is derived from 6-hydroxyhexanoic acid. Substituted epsilon-caprolactones, and mixtures thereof, are available by conversion of various substituted cyclohexanones, as described in copending application Serial No. 548,754, filed November 23, 1955. The cyclohexanones may be obtained from substituted phenols or by other convenient synthetic routes.

Among the substituted epsilon-caprolactones considered most suitable for the purposes of the invention are the various monoalkyl epsilon-caprolactones such as the monomethyl-, monoethyl-, monopropyl-, monoisopropyl-, etc. to monododecyl epsilon-caprolactones; dialkyl epsilon-caprolactones in which the two alkyl groups are substituted on the same or different carbon atoms, but not both on the epsilon carbon atom; trialkyl epsilon-caprolactones in which two or three carbon atoms of the lactone are substituted, so long as the epsilon carbon atom is not disubstituted; alkoxy epsilon-caprolactones such as methoxy and ethoxy epsilon-caprolactones; and cycloalkyl, aryl, and aralkyl epsilon-caprolactones such as cyclohexyl, phenyl and benzyl epsilon-caprolactones. Mixtures of substituted lactones and mixtures of substituted lactones with unsubstituted lactones have been found to be particularly desirable.

Lactones having more than six carbon atoms in the ring, e.g., zeta-enantholactone and eta-caprylolactone may also be reacted with bifunctional initiators in order to prepare the polyesters in accordance with the first stage of the method of the invention.

The relative molar proportions of substituted to unsubstituted lactones employed in the preparation of the polyester may vary widely depending upon the characteristics desired in the gum stock and in the final elastomer. The non-hardening properties of the gum stock improves and crystallization of the cured elastomer diminishes as the proportion of substituted lactone increases, whereas the tensile strength and toughness of the elastomer improves with an increase in the proportion of unsubstituted lactone. For a generally optimum combination of non-hardening and low brittle temperature properties and high strength characteristics, it is preferable that the molar proportion of substituted to unsubstituted lactone be within the range of about 10:90 to 50:50. It is to be understood, however, that substantial departures from this range may be made without departing from the teachings of this invention if the requirements of the gum stock or final elastomer are such as to warrant a substantial reduction in brittle temperature at the expense of tensile strength or vice versa.

Bifunctional initiators that are suitable in this stage of the method are generally compounds having two reactive sites capable, with or without the aid of a catalyst, of opening the lactone ring in the manner illustrated in Equation I, and adding it onto the initiator as an open chain. These initiators are represented by the general formula R' (ZH)$_2$ in which R' is an organic radical selected from the group consisting of aliphatic, cycloaliphatic, aromatic and heterocyclic radicals, the Z's stand for members selected from the group consisting of —O—, —NH— and —NR''—, and R'' is a hydrocarbon radical selected from the group consisting of alkyl, aryl, aralkyl and cycloalkyl radicals. They include diols, diamines, amino alcohols, and vinyl polymers, as well as amides, sulfonamides, hydrazones, semicarbazones, and oximes.

Diols useful as initiators for reacting with the lactones in the first stage include alkylene glycols of the general formula HO(CH$_2$)$_n$OH, where $n$ equals 2 to 10, glycols of the formulae HO(CH$_2$CH$_2$O)$_n$H and

where $n$ equals 1 to 40, 2,2-dimethyl-1,3-propanediol, 2,2-diethyl-1,3-propanediol, 3-methyl-1,5-pentanediol, various cyclohexanediols, 4,4'-methylenebiscyclohexanol, 4,4'-isopropylidenebiscyclohexanol, various xylenediols, various hydroxymethylphenethyl alcohols various hydroxymethyl-3-phenylpropanols, various phenylenediethanols, various phenylenedipropanols, and various heterocyclic diols such as 1,4-piperazine diethanol.

Other suitable initiators include polyoxyalkylated derivatives of compounds having two reactive hydrogen atoms. These compounds may contain primary or secondary hydroxyls, phenolic hydroxyls, mercapto, amido, sulfonamido, or carboxyl groups and are obtainable by reacting alkylene oxides such as ethylene oxide, propylene oxide, 1-butylene oxide, 2-butylene oxide, isobutylene oxide, butadiene monoxide, styrene oxide, or mixtures of these monoepoxides with such compounds as diols of the class HO(CH$_2$)$_n$OH, where $n$ equals 2 to 10, propylene glycol, 2,2'-thiodiethanol; phenols such as 4,4'-methylenediphenol, 4,4'-isopropylidenediphenol and resorcinol; mercapto alcohols like 2-mercaptoethanol; dibasic acids such as maleic, succinic, glutaric, adipic, pimelic, sebacic, phthalic, hexahydrophthalic and oxy- and thiodivaleric.

Amino alcohols that are useful as initiators include aliphatic amino alcohols of the general formula

where $n$ equals 2 to 10, N-methylethanolamine, isopropanolamine, N-methylisopropanolamine; aromatic amino alcohols like paraamino-phenethyl alcohol and para-amino-alpha-methylbenzyl alcohol; and various cycloaliphatic amino alcohols like 4-aminocyclohexanol.

Among the diamines useful for reaction with the lactones are aliphatic diamines of the general formula H$_2$N(CH$_2$)$_n$NH$_2$, monosecondary diamines of the general formula R''NH(CH$_2$)$_n$NH$_2$, and disecondary diamines of the general formula R''NH(CH$_2$)$_n$NHR'', where $n$ equals 2 to 10, and where R'' is alkyl, aryl, aralkyl, or cycloalkyl; aromatic diamines like meta-phenylenediamine, para-phenylenediamine, toluene-2,4-diamine, toluene-2,6-diamine, 1,5-naphthalenediamine, 1,8-naphthalenediamine, meta-xylylenediamine, para-xylylenediamine, benzidine, 3,3'-dimethyl - 4,4' - biphenylenediamine, 3,3'-dimethoxy-4,4'-biphenylenediamine, 3,3'-dichloro-4,4'-biphenylenediamine, 4,4'-methylenedianiline, 4,4'-ethylenedianiline, 2,3,5,6-tetramethyl-para-phenylenediamine, 2,5-fluoroenediamine, and 2,7-fluorenediamine; cycloaliphatic diamines such as 1,4-cyclohexanediamine and 4,4'-methylenebiscyclohexylamine; and heterocyclic diamines such as piperazine and 2,5-dimethylpiperazine.

Further useful bifunctional initiators are polymers of monoepoxides obtainable by polymerizing with such catalysts as oxonium salts of hydrogen halides; metal or non-metal halides whose etherates are oxonium complexes; electrophilic metal or non-metal halides in the presence of hydrogen halides, acyl halides, or anhydrides of organic and inorganic acids; and inorganic acids and anhydrides thereof whose anions show little tendency to polarize. Polymers containing hydroxyl end-groups may be obtained by treating these products with alkaline reagents upon completion of the polymerization reaction. Among suitable monoepoxides for preparing such polymers are tetrahydrofuran, trimethylene oxide, propylene oxide, ethylene oxide, or mixtures thereof.

The preparation of the polyester in the first stage can therefore be summarized by the equation:

(IA)
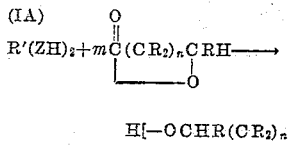

$$H[-OCHR(CR_2)_nC-]_xZR'Z[-C(CR_2)_nCRHO-]_xH$$

in which $n$ is at least four; at least $n+2$ R's are hydrogen; the remaining R's are members selected from the group consisting of hydrogen, alkyl, cycloalkyl, alkoxy and aromatic radicals; at least one R in at least one of the groups in a series is a substituent other than hydrogen; R' is an organic radical selected from the group consisting of aliphatic, cycloaliphatic, aromatic and heterocyclic radicals; the Z's stand for members selected from the group consisting of —O—, —NH— and —NR"—; R" is a hydrocarbon radical selected from the group consisting of alkyl, aryl, aralkyl and cycloalkyl radicals; $m$ is at least two; and the sum of the $x$'s is equal to $m$.

To initiate and continue the polymerization of the lactone, the lactone and the polyfunctional initiator are preferably heated to a temperature between about 120 and 200° C. in order to achieve a practical and desirable rate of reaction with a minimum of decomposition. The temperature may be considerably lower however, i.e., as low as about 50° C. at the sacrifice of speed of reaction. It may also be considerably higher, i.e., up to about 300° C., although care must be taken at such higher temperatures because of the more likely losses, at temperatures above 250° C., due to decomposition or undesirable side reactions. Generally, therefore, a temperature range of 50 to 300° C. is considered operable and a more limited range between about 120 and 200° C. is considered preferable.

The polymerization may be, and preferably is, accelerated by including minor amounts, ranging from as low as 0.001% to as high as about 0.5% by weight, of catalyst in the reaction mixture. A wide variety of catalysts may be employed for this purpose. These include particularly basic and neutral, as well as acidic, ester interchange catalysts.

The basic and neutral ester interchange catalysts, which are preferred because they have no tendency to form a non-reactive site in the polyester molecule, include the metals lithium, sodium, potassium, rubidium, caesium, magnesium, calcium, barium, strontium, zinc, aluminum, cobalt, titanium, germanium, tin, lead, antimony, arsenic and cerium, as well as the alkoxides thereof, the carbonates of the alkali- and alkaline earth metals, organic tin oxides and titanates, titanium chelates and acylates, litharge, zinc oxide, antimony trioxide, germanium dioxide, cerium trioxide, cobaltous acetate, zinc borate and lead salts generally.

Monocarboxylic acids, which have catalytic activity in opening the lactone ring and promoting their polymerization but are not preferred because they tend to acylate the reactive terminal hydroxyl groups of a polyester, include acetic acid and other aliphatic monocarboxylic acids up to and including hexanoic acid as well as derivatives thereof such as 2-ethylhexanoic acid. It is recommended, if a monocarboxylic acid is used as a catalyst, that it be used in amounts within the lower portion of the range specified, i.e., in an amount of the order of 0.001% and not exceeding about 0.5% by weight.

Dicarboxylic acids, such as succinic, maleic, glutaric, adipic, sebacic, and phthalic acids, may also be used to catalyze the polymerization reaction, although they tend to introduce carboxyl end-groups into the polyester. Among other suitable catalysts are hydrochloric acid, sulfuric acid, phosphoric acid, zinc chloride, aluminum trichloride, tin dichloride, tin tetrachloride, and boron trifluoride. However, when strongly acidic components are employed as catalysts, the reaction temperature should preferably be kept low, e.g., at 50–150° C., in order to prevent excessive dehydration during the polymerization reaction. Furthermore, it is advantageous to neutralize acidic catalysts prior to conducting reaction stage two.

The duration of the polymerization varies from about a few minutes to about a week depending upon the lactone or mixtures of lactones selected, the initiator, the reaction temperature and the catalyst, if one is present. If it is desired to obtain a product of superior color, then it is preferable to conduct the reaction in the absence of oxygen. This may be accomplished, for example, by operating in a partial vacuum or in the presence of an inert gas such as nitrogen, which may be passed through the reaction mixture. After the polymerization is completed, any unreacted monomer may be removed by applying a vacuum thereto at elevated temperature, e.g., a vacuum of 1 to 5 mm. mercury at 120 to 160° C.

It is apparent from Equation I above that the preparation of the polyester in the first stage of the method of this invention has the unique advantage of permitting accurate control over the average molecular weight of the polyester, and further of promoting the formation of a substantially homogeneous polyester in which the molecular weights of the individual molecules are substantially all very close to the average molecular weight. This control, as is evident from Equation I, is obtained by pre-selecting the molar proportions of lactone and bifunctional initiator in a manner that will readily be appreciated by those skilled in the art. Thus, for example, if it is desired to form a polyester in which the average molecular weight is approximately twenty times the molecular weight of the initial lactone or lactone mixture, then the proportions of lactone to initiator utilized in the polymerization are fixed at approximately 20:1 inasmuch as it is to be expected that on the average each molecule of initiator will add on an approximately equal number of lactones and an average of twenty lactone molecules would be available to each molecule of initiator.

A convenient method of measuring the molecular weight of the polyester formed in the first stage is to determine the average number of carboxyl and hydroxyl groups in a given amount of the linear polyester. The acid number (milligrams of KOH per gram of polyester using phenolphthalein as an indicator) is a measure of the number of terminal carboxyl groups in a polyester. In the polyesters produced in Stage I the acid or carboxyl number is ordinarily and inherently very close to zero. It should not, however, exceed ten. The hydroxyl number, which is a measure of the number of terminal hydroxyl groups and is defined in terms of milligrams of KOH per gram of polyester, is determined by adding pyridine and acetic anhydride to the polyester and titrating the acetic acid formed with KOH as described in Ind. Eng. Chem., Anal. Ed. vol. 16, pages 541–49, and in Ind. Eng. Chem., Anal. Ed., vol. 17, page 394. The sum of the acid or carboxyl number and the hydroxyl number, referred to as the reactive number, is an indication of the average number of terminal groups present in the polyester and therefore is in turn an indication of the number of molecules in the mass and the degree of polymerization. A polyester containing long chain molecules will have a relatively low reactive number while a polyester containing short chain molecules will possess a relatively high reactive number.

I prefer to select my starting lactones and initiator and their relative proportions so as to produce polyesters having a carboxyl number as low as possible and certainly no greater than ten and a hydroxyl number between about forty and about sixty so that the average molecular weight of the polyester will be in the range of about 1900 to 2800. This range of molecular weights is preferred because it yields linearly extended polyester-polyurethane diisocyanate chains of optimum length in the second stage and promotes the eventual formation of an elastomer having optimum properties of low brittle temperature, high tensile strength and non-hardening qualities. It is to be understood, however, that substantial departures can be made from this range of molecular weights, i.e., to as low as about 300 (corresponding to a hydroxyl number of 374) if more rigid properties are desired and to as high as 5000 and even 7000 (corresponding to a hydroxyl number of 16) if greater elasticity is more important than high tensile strength.

One of the outstanding advantages of the method of the invention, as distinguished from the superior characteristics of the products obtained thereby, is that the preparation of the polyesters is one that is inherently capable of being carried out under substantially anhydrous conditions whereas conventional methods of preparing polyesters, e.g., by condensation of dicarboxylic acids with a glycol, diamine or amino alcohol, results in a splitting off of water which requires considerable care to remove. It is important that the polyester utilized in the second stage of the process be in a substantially anhydrous condition if the formation of bubbles or premature cross-linking is to be avoided. The polyesters produced in the first stage of this process are stable and may be maintained in a substantially anhydrous condition with relatively little difficulty.

SECOND STAGE

(Linear extension)

I have found it advantageous to extend the linear polyesters, i.e., substituted polyesters, copolyesters and polyester blends, obtained in the first stage by reacting, after careful removal of any traces of moisture, their terminal hydroxyl groups with an excess of diisocyanate, as represented by the following reaction:

(II)

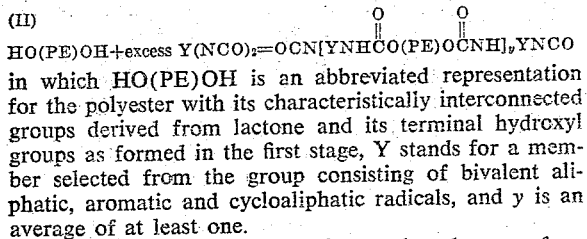

HO(PE)OH+excess Y(NCO)$_2$=OCN[YNHČO(PE)OČNH]$_y$YNCO in which HO(PE)OH is an abbreviated representation for the polyester with its characteristically interconnected groups derived from lactone and its terminal hydroxyl groups as formed in the first stage, Y stands for a member selected from the group consisting of bivalent aliphatic, aromatic and cycloaliphatic radicals, and y is an average of at least one.

It will be noted from Equation II that the use of an excess of diisocyanate provides an efficient means of control over the degree of linear extension of the polyester-polyurethane molecule. If the proportions of polyester and diisocyanate are chosen so that the number of reactive terminal hydroxyl groups on the polyester are equal to the number of reactive isocyanate groups on the diisocyanate, extremely long, high molecular weight chains would be formed. The resulting polymer would have a sharp melting point, retain its original solubility properties, and be capable of being drawn into filaments. By utilizing an optimum excess of about 30 to 60% diisocyanate however, close control is maintained over the length of the polyester-polyurethane molecule and in the formation of a polyester-polyurethane diisocyanate having the most desirable characteristics for the production, at a later stage, of a rubbery polymer which softens gradually over a wide range of temperature and is not subject to cold drawing. A greater excess, up to several hundred percent, of diisocyanate is desirable if the desideratum is a more rigid type of polyurethane product.

The reaction of the polyester with the diisocyanate can take place at temperatures varying from room temperature to above 300° C. The preferred temperature is in the range of about 100–150° C., the upper limit of the reaction temperature being selected on the basis of the thermal stability of the reaction products and of the diisocyanates, and the lower limit being determined by the lowest economical rate of reaction. Below 75° C. the rate of reaction is too slow to be practicable unless a catalyst is employed, and above about 300° C. there is danger of destructive decomposition of the reactants and reaction product.

The time of reaction may vary from several minutes to as much as a day depending upon the reaction temperature and the identity of the particular polyester and diisocyanate as well as upon the absence or presence of accelerator or retarder and the identity thereof. Most desirably, conditions are adjusted so as to provide a controllable reaction that is completed in about ten to sixty minutes.

If desired, the reaction may be accelerated by employing catalysts such as inorganic bases and particularly tertiary organic bases such as tertiary amines and phosphines. Among the latter are N,N'-dimethylaniline, N,N' - dimethyl - hexahydroaniline, N,N' - dimethylpiperazine, N-methylmorpholine, tribenzylamine, N,N'-dimethylbenzylamine, triethylamine, trialkyl phosphines, dialkylphenyl phosphines, alkyldiphenyl phosphines, etc. Catalyst concentrations may be varied considerably Concentrations between about .001 and .5%, based on the weight of the total ingredients, have been found sufficient.

Among the retarders suitable for the polyester-diisocyanate reaction are acids such as hydrochloric acid, sulfuric acid, phosphoric acid, boric acid, and organic acids; acyl halides such as acetyl chloride and acetyl bromide; sulfonyl halides such as para-toluenesulfonylchloride; inorganic acid halides like phosphorous tribromide, phosphorous trichloride, phosphorous oxychloride, sulfuryl chloride, and thionyl chloride; and sulfur dioxide or acidic sulfones. The addition of a retarder is desirable in some instances not only in order to slow down as the name implies, the rate of reaction between terminal hydroxyl and isocyanate groups, but also for inhibiting reaction between the isocyanate groups and the urethane groups formed in the second stage.

If the starting polyester from the first stage contains alkaline reacting materials, it should be neutralized or acidified slightly by addition of acids or acid chlorides. For instance, polyethylene oxides are prepared by catalyzing the ethylene oxide polymerization with sodium or potassium hydroxide or other basic catalysts. If these polyethylene oxides are employed as initiators for the lactone polymerization, the resulting polyether-ester contains some sodium or potassium carboxylate end-groups which are efficient catalysts for the isocyanate reaction in stage two. In order to prevent almost instantaneous or premature cross-linking in stage two (a procedure which yields inferior elastomers), the polyether-ester product should be neutralized or slightly acidified.

The chain lengthening reaction of the polyester with the diisocyanate may be carried out with a wide variety of aliphatic, cycloaliphatic or aromatic diisocyanates, the aromatic diisocyanates being most suitable because of their greater reactivity. Among the various diisocyanates useful in this reaction are m- and p-phenylene diisocyanates 2,4- and 2,6-tolylene diisocyanates, 2,3,5,6-tetramethylpara-phenylene diisocyanate, m-xylylene diisocyanate, 4,4'-biphenylene diisocyanate, 3,3'-dimethyl-4,4'-biphenylene diisocyanate, 3,3'-dimethoxy-4,4'-biphenylene diisocyanate, p,p'-bibenzyl diisocyanate, p,p'-diphenylmethane diisocyanate, 4,4'-methylene bis ortho tolyl isocyanate, 1,5-naphthalene diisocyanate, fluorene diisocyanates, pyrene diisocyanates, chrysene diisocyanates, etc. The table in the publication of Siefken (Annalen, 562, pages 122–135 (1949)), lists numerous other diisocyanates which are useful for performing this reaction.

THIRD STAGE

(Gum stock preparation)

In order to further extend the polyester-polyurethane diisocyanates obtained in the second stage and also to bring about a cross-linking of the molecules, the polyester-polyurethane is reacted with a polyfunctional, preferably a bifunctional reactant. Such a further chain lengthening reaction is illustrated in Equation III below with three mols of an amino alcohol and two mols polyester-polyurethane diisocyanate, abbreviated for purposes of clarity is OCN(PE—PU)NCO to indicate the reactive terminal isocyanate groups obtained by using an excess of diisocyanate in stage two, to show the reactions of hydroxyl and amino groups of a bifunctional reactant.

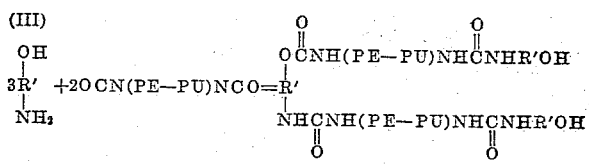

(III)

It will be evident from Reaction III that the hydroxyl group of a bifunctional reactant in this stage reacts with a terminal isocyanate group to form a urethane group —OOCNH— and that the amino group of a bifunctional reactant does so by forming a urea group —HNCONH—. There is reason to believe that, simultaneously with Reaction III, the reaction products of Reaction III and free diisocyanates react to effect a cross-linking. These reactions can take place in many ways. Thus, for example, a terminal isocyanate group can react with a reactive hydrogen of (a) an amide group of a stage two product prepared initially with an amine or amino alcohol to form an acyl urea cross link, (b) a urethane group of a stage two product or a stage three product prepared with a hydroxyl group-containing reactant to form an allophanic ester cross link, and (c) a urea group of a stage three product prepared with an amino group-containing reactant to form a biuret cross link. Some of these reactions may also take place, albeit at a much reduced rate, before the addition of a polyfunctional reactant in the third stage, because of the formation of a number of urethane groups in the second stage and their ability to enter into slow cross linking reaction with terminal isocyanate groups.

The reactant with which the polyester-polyurethane diisocyanate from the second stage is reacted in this stage is preferably a bifunctional compound such as a glycol, an amino alcohol, or a diamine. It is entirely within the scope of the method of the invention, however, to utilize in this stage higher functional reactants having three or even more reactive hydroxy or amino groups and furthermore to utilize such reactants as water and others containing carboxylic acid groups.

Substantially all of the bifunctional reactants that are useful in the first stage are also useful in this stage. It is inadvisable, however, where high tensile strength of the final product is desirable, to use those of higher molecular weight than, for example, polyoxyalkylene compounds of the formulae $(HO(CH_2CH_2O)_nH$ and $HO[CH(CH_3)CH_2O]_nH$ where $n$ is greater than about six. Among the bifunctional reactants found to be particularly suitable alone or in admixture with one another in this stage are ethylene glycol, trimethylene glycol, 1,4-butynediol, 1,4-butenediol, tetramethylene glycol, pentamethylene glycol, hexamethylene glycol, decamethylene glycol, quinitol, ethanolamine, 3-aminopropanol, 4-aminobutanol, 5-aminopentanol, 6-aminohexanol, p-aminobenzyl alcohol, m-aminoalpha-methylbenzyl alcohol, p-aminophenylethyl alcohol, ethylenediamine, trimethylenediamine, tetramethylenediamine, pentamethylenediamine, hexamethylenediamine, decamethylene diamine, m-phenylenediamine, 2,4-tolylylenediamine, p-phenylenediamine, 4,4'-biphenylenediamine, 3,3'-dichloro-4,4'-biphenylenediamine, 3,3'-dimethyl-4,4'-biphenylenediamine, 3,3'-dimethoxy-4,4'-biphenylenediamine, p,p'-bibenzyldiamine, p,p'-diphenylmethanediamine, 2,5- and 2,7-fluorenediamines, 3,8- and 3,10-pyrenediamines, piperazine, various methyl-, and polymethylpiperazines. Bifunctional reactants of this type are preferred in this stage of the process for the reason that they act as chain extenders without forming carbon dioxide bubbles in the mass.

Where elasticity of the gum stock and final resin is not an object and rigidity is permissible or desirable, it is feasible to employ in this stage higher molecular weight bifunctional reactants and such polyfunctional materials as polyols and polyamines, e.g., 1,2,4-butanetriol, 1,2,6-hexanetriol, glycerol, trimethylolpropane, trimethylolethane, pentaerythritol, diethanolamine, diisopropanolamine, 2-(2-aminoethylamino) ethanol, diethylenetriamine, and triethylenetetramine.

Such agents as water and carboxylic acid are also operable and in fact desirable where the production of a foamed product is the ultimate objective and where preparation of a storable gum stock is not required. If desired, foam-producing $CO_2$ bubbles can be removed by milling or other processes.

While Reaction III is shown, for illustrative purposes only, as involving three mols of a bifunctional reactant and two mols of a polyester-polyurethane diisocyanate, i.e., a 50% excess of a bifunctional reactant, the amount of bifunctional employed for optimum results is within the range of 1 to 20% excess. The use of more than 20% excess results in a system that is generally more rigid than desirable for the production of elastomeric materials and the use of an equivalent or less than equivalent amount of bifunctional results in a completely cross-linked system which ceases to be a gum stock. It is to be understood, therefore, that while a 1 to 20% excess of bifunctional reactant is recommended for the third stage, departures from this amount in order to obtain more rigid or more completely crosslinked systems are not outside the scope of the invention.

The reaction of the polyester-polyurethane diisocyanate with polyfunctional reactant can be carried out at a temperature ranging from room temperature to over 200° C. Temperatures of the order of 100–150° C. are preferred. The time of reaction may vary from several minutes to one day depending upon the reaction temperature. If desired, a catalyst similar to that employed in the second stage may be used in like amounts.

FOURTH STAGE

(Cure)

The final curing is carried out with a polyisocyanate, preferably an aromatic polyisocyanate. While the polyisocyanate employed in the final cure may, if desired, be the same or a different diisocyanate as compared with that used in the second stage, it may also be a tri- or higher functional isocyanate. One of the more attractive types of polyisocyanate useful in the fourth stage is the product

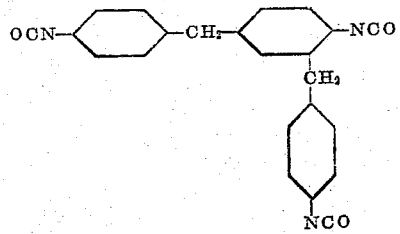

as well as the isomers thereof, obtainable by phosgenation of the reaction product of aniline and formaldehyde.

In the preferred embodiment of the invention, approximately 3 to 7% by weight, based on the weight of gum stock, of additional polyisocyanate is admixed with the gum stock on a conventional rubber mill or in any suitable mixing device and the mixture is cured in the mold at a temperature preferably of the order of about 140–160° C. in a few minutes. If a longer molding time than fifteen minutes is not objectionable, the temperature of the cure may be considerably lower, e.g., as low as about 100° C. In the mold, the cure is accomplished apparently by a reaction of excess amino or hydroxyl groups with the newly admixed polyisocyanate, and secondly by reaction of the remaining free terminal isocyanate groups with hydrogen atoms of the urea and urethane groups to form a strongly cross-linked polymer.

By this procedure, elastomers possessing excellent tensile strength, exceptional low brittle temperature and no perceptible hardening or crystallization are obtained. The very favorable non-hardening properties of the elastomers obtained in accordance with the method of this invention are not only demonstrated by testing after extended storage but by means of X-ray patterns of the elastomers stretched to 300–400% their original length. While elastomers prepared by other methods and from other starting materials show a tendency to crystallize, the elastomers prepared by the method of the invention show either virtually no crystallinity or not enough to cause hardening of the elastomeric composition.

A considerable number of modifying agents may be added to the elastomer at any stage of its production after the formation of the polyester. These materials include fillers such as carbon blacks, various clays, zinc oxide, titanium dioxide, and the like; various dyes; plasticizers such as polyesters which do not contain any reactive end-groups, stearic and other fatty acids, organic esters of stearic and other fatty acids, metal salts of fatty acids, dioctyl phthalate, tetrabutylthiodisuccinate, and the like. It is also possible to include releasing agents such as mold release agents that are sometimes very helpful in the processing of the elastomeric compositions. Among those useful for this purpose are films of "Teflon" or fluorothene resins, silicone oils, fluorothene oils, polyethylene greases, paraffin waxes, petroleum jelly, "Carbowaxes," mineral oils, vegetable oils, and the like.

The advantages and utility of the method and products of the invention will become further apparent from the following detailed examples included for illustrative purposes only as showing the best modes now contemplated at present for carrying out the invention.

EXAMPLE 1

A polyester was prepared by heating, at 165–190° C. for 8.5 hours, 57 grams of unsubstituted epsilon-caprolactone, a 78 gram mixture of trimethyl-epsilon-caprolactones and 13.2 grams of 2,2-diethyl-1,3-propanediol in the presence of 1 cc. of 2-ethylhexanoic acid as catalyst. The resulting polyester was stripped at temperatures up to 205° C. at a pressure of 3 mm. mercury, leaving 111 grams of a liquid, amber-colored polymer having a hydroxyl number of 92.5 and an estimated molecular weight of approximately 1200.

A three gram portion of this polyester was dissolved in 10 cc. chlorobenzene, 0.876 gram 4,4'-diphenylene diisocyanate were added, and the mixture was refluxed for three hours. Steam was then led through the reaction mixture and after a short time a highly cross-linked elastomer, containing bubbles, was obtained.

A six gram portion of the polyester was reacted with 1.75 grams 4,4'-biphenylene diisocyanate for 3.5 hours at 130° C. The resulting viscous material was then poured onto a glass plate, spread into a thin film, and exposed to air-humidity for five hours at 98° C. A strong elastomeric material, containing bubbles, was thus formed.

A thirty gram sample of the polyester was reacted at 130° C. for one hour with 9.44 grams of 4,4'-biphenylene diisocyanate. Thereupon 0.95 gram of quinitol (1,4-cyclohexanediol) were added and the mixture was stirred for an additional 5.5 hours at 100–125° C. The resulting gum stock was a crumbly elastomer. It was further heated at 100° C. for sixteen hours and then molded into a disc having a thickness of 0.07" which had the following physical properties:

| | |
|---|---:|
| Tensile strength, p.s.i. | 900 |
| Elongation, percent | 875 |
| Load, 100% elongation, p.s.i. | 125 |
| ASTM stiffness modulus, p.s.i. | 231 |
| Hardness, Shore "A" | 40 |

EXAMPLE 2

221 grams of gamma-methlyl-epsilon-caprolactone were heated with 7.1 grams ethylene glycol under nitrogen and in the presence of 0.005 gram potassium carbonate for forty-eight hours at 150–180° C. After this time, no monomer could be recovered. The resulting polyester was a slightly yellow, viscous liquid having a hydroxyl number of 54.1, a carboxyl number of 0.1 and a molecular weight of 2075.

100 grams of this polyester was heated to 130–150° C. with 18.1 grams of p,p'-diphenylmethane diisocyanate. After the reactants had cooled to 120° C., 1.8 grams of ethanolamine were added and the mixture was stirred until an elastomeric gum stock was obtained. This elastomeric product showed no tendency to harden and was milled into a thin sheet on a rubber mill.

A portion of the gum stock was cured in a mold for fifteen minutes at 160° C., after admixture of 5% by weight of 4,4'-biphenylene diisocyanate. A disc of 0.07" thickness of this elastomer exhibited the following physical properties:

| | |
|---|---:|
| Tensile strength, p.s.i. | 1000 |
| Elongation at break, percent | 640 |
| Load at 300% elongation, p.s.i. | 325 |
| Brittle temperature, ° C. | −62 |
| Hardness, Shore "A" | 45 |

EXAMPLE 3

120 grams of unsubstituted epsilon-caprolactone and 80 grams of a mixture of beta-, gamma- and delta-methyl-epsilon-caprolactones were copolymerized with 6.4 grams of ethylene glycol in the presence of 0.02 gram calcium by heating to 180° C. under nitrogen for eighty-six hours. After this time, no monomers could be recovered under vacuum. The resulting polyester was a slightly yellow colored, viscous liquid having a hydroxyl number of 58.1 and a carboxyl number of 1.0.

115 grams of this polyester were reacted with 22.3 grams of p,p'-diphenylmethane diisocyanate at 130–150° C. After the reactants had cooled to 120° C., 2.2 grams ethanolamine were added and the mixture was stirred until an elastomeric gum stock was obtained. This product was milled into a thin sheet on a rubber mill. It did not harden on standing.

5% by weight of 4,4'-biphenylene diisocyanate was added to a portion of this gum stock on a rubber mill. The material was then molded into a disc of 0.07" thickness by heating under pressure for fifteen minutes at 160° C. The resulting elastomer possessed the following physical properties:

| | |
|---|---|
| Tensile strength, p.s.i. | 1310 |
| Elongation at break, percent | 450 |
| Load at 300% elongation, p.s.i. | 550 |
| ASTM stiffness modulus, p.s.i. | 600 |
| Brittle temperature, ° C. | −74 |
| Hardness, Shore "A" | 57 |

EXAMPLE 4

140 grams of a mixture of beta-, gamma- and delta-methyl-epsilon-caprolactone, similar to the mixture employed in Example 3, was copolymerized with 3.7 grams of ethylene glycol in the presence of 0.01 gram calcium by heating to 170–180° C. under nitrogen for eighty-six hours. After this time, no monomer could be recovered under vacuum. The resulting polyester was a viscous liquid having a hydroxyl number of 49.8, a carboxyl number of 1.0 and a molecular weight of 2250.

115 grams of this polyester were reacted with 21.1 grams of p,p'-diphenylmethane diisocyanate at 130–150° C. After the reactants had cooled to 120° C., 1.9 grams ethanolamine were added and the mixture was stirred until an elastomeric gum stock was obtained. This product showed no tendency to harden.

5% by weight of 4,4'-biphenylene diisocyanate were added to a portion of this gum stock on a rubber mill. The mixture was molded into a disc of 0.07" thickness by heating under pressure for fifteen minutes at 160° C. The resulting elastomer possessed the following physical properties:

| | |
|---|---|
| Tensile strength, p.s.i. | 790 |
| Elongation at break, percent | 308 |
| Load at 300% elongation, p.s.i. | 750 |
| Brittle temperature, ° C. | −72 |
| Hardness, Shore "A" | 52 |

EXAMPLE 5

A copolyester was prepared by heating 539 grams epsilon-caprolactone and 602 grams of a mixture of beta-, gamma- and delta-methyl-epsilon-caprolactones with 31 grams ethylene glycol in the presence of 0.55 gram calcium methoxide at 160–180° C. under nitrogen for twenty hours. The resulting copolyester was a yellow, viscous liquid having a hydroxyl number of 48.4, a carboxyl number of 0.3 and a molecular weight of about 2315.

300 grams of this copolyester were reacted with 52.2 grams 3,3'-dimethyl-4,4'-biphenylene diisocyanate at 130–140° C. Thereafter, with the reactants at 130° C., 4.8 grams ethanolamine were added and the mixture was stirred until an elastomeric gum stock was obtained. This product did not harden on prolonged standing.

To two portions of this gum stock, the following ingredients were added on a rubber mill:

| Sample A | Sample B |
|---|---|
| 3% by weight of 3,3'-dimethyl-4,4'-biphenylene diisocyanate. | 7% by weight of 3,3'-dimethyl-4,4'-biphenylene. |

The resulting materials were then molded into discs of 0.07" thickness by heating under pressure for fifteen minutes at 160° C. The cured elastomers possessed the following physical properties:

| | Sample A | Sample B |
|---|---|---|
| Tensile strength, p.s.i. | 3,300 | 2,600 |
| Elongation, Percent | 635 | 415 |
| Load at 300% Elongation, p.s.i. | 600 | 1300 |
| Brittle Temperature, ° C. | −74 | below −76 |
| Hardness | 60 | 63 |

EXAMPLE 6

A copolyester was prepared by heating 500 grams of a mixture of alpha-, beta-, gamma-, delta- and epsilon-methyl-epsilon-caprolactones (obtained from a mixture of ortho-, meta- and para-cresols) with 14.5 grams ethylene glycol in the presence of 0.25 gram dibutyltin oxide at 170° C. under nitrogen for four hours. The resulting copolyester was a slightly yellow, viscous liquid having a hydroxyl number of 43.7, a carboxyl number of 2.3 and a molecular weight of about 2320.

300 grams of this copolyester were reacted at 130–140° C. with 54 grams of 3,3'-dimethyl-4,4'-biphenylene diisocyanate. Thereafter, with the reactants at 130° C., 5 grams ethanolamine were added and the mixture was stirred until an elastomeric gum stock was obtained. The gum stock showed no tendency to harden on standing.

5% by weight of 3,3'-dimethyl-4,4'-biphenylene diisocyanate was admixed with a portion of this gum stock on a cold rubber mill. The material was then molded into a disc of 0.07" thickness by heating under pressure for fifteen minutes at 160° C. The cured elastomer exhibited the following physical properties:

| | |
|---|---|
| Tensile Strength, p.s.i. | 1700 |
| Elongation at break, percent | 625 |
| Load at 300% elongation, p.s.i. | 750 |
| Brittle temperature, ° C. | −56 |
| Hardness | 55 |

EXAMPLE 7

A copolyester was prepared by heating 261 grams epsilon-caprolactone and 139 grams of a mixture of dimethyl-epsilon-caprolactones (obtained from a xylenol fraction boiling at 212.5–219° C.) with 11.6 grams ethylene glycol in the presence of 0.2 gram dibutyltin oxide at 170° C. under nitrogen for nineteen hours. The resulting copolyester was a yellow, viscous liquid having a hydroxyl number of 48.3, a carboxyl number of 1.9 and a molecular weight of about 2190.

300 grams of this copolyester were reacted with 55.3 grams 3,3'-dimethyl-4,4'-biphenylene diisocyanate at 130–140° C. Thereafter, with the reactants at 130° C., 5.1 grams ethanolamine were added and the mixture was stirred until an elastomeric gum stock was obtained. This gum stock was rolled out into a thin sheet on a rubber mill and showed no tendency to harden on standing.

To each of two portions of this gum stock, 5% by weight of 3,3'-dimethyl-4,4'-biphenylene diisocyanate were added on a cold rubber mill. The first portion (sample A) was cured by heating under pressure for thirty minutes at 160° C., while the second portion (sample B) was cured by heating under pressure for fifteen minutes at 160° C. The cured test specimens, having a thickness of 0.07", possessed the following physical properties:

| | Sample A | Sample B |
|---|---|---|
| Tensile Strength, p.s.i. | 2,350 | 2,125 |
| Elongation, Percent | 360 | 580 |
| Load at 300% Elongation, p.s.i. | 1,750 | 810 |
| Brittle Temperature, ° C. | −66 | −66 |
| Hardness | 70 | 61 |

EXAMPLE 8

A copolyester was prepared by heating 270 grams epsilon-caprolactone and 130 grams of a mixture of methyl-epsilon-caprolactones (obtained from a mixture of ortho-, meta- and para-cresols) with 11.6 grams ethylene glycol in the presence of 0.2 gram dibutyltin oxide at 170° C. under nitrogen for twenty-two hours. The resulting copolyester was a slightly yellow, viscous liquid having a hydroxyl number of 49.4, a carboxyl number of 0.8 and a molecular weight of about 2200.

300 grams of this copolyester were reacted at 130° C. with 54.2 grams of 3,3'-dimethyl-4,4'-biphenylene diisocyanate. Thereafter, with the reactants at 130° C., 4.8 grams ethanolamine were added and the mixture was stirred until an elastomeric gum stock was obtained. The gum stock was milled into a thin sheet on a rubber mill and showed no tendency to harden on standing.

7% by weight of 3,3'-dimethyl-4,4'-biphenylene diisocyanate was admixed with a portion of this gum stock on a cold rubber mill. The material was then molded into a disc of 0.07" thickness by heating under pressure for fifteen minutes at 160° C. The resulting elastomer exhibited the following physical properties:

Tensile strength, p.s.i. _____ 2825.
Elongation at break, percent _____ 525.
Load at 300% elongation, p.s.i. _____ 1100.
Brittle temperature, ° C. _____ below −74.
Hardness _____ 70.

EXAMPLE 9

A copolyester was prepared by heating 500 grams of a mixture of methyl-epsilon-caprolactones with 14.5 grams ethylene glycol in the presence of 0.25 gram dibutyltin oxide at 170° C. under nitrogen for three hours. The resulting copolyester was a yellow, viscous liquid having a hydroxyl number of 43.7, a carboxyl number of 2.3 and a molecular weight of about 2320.

A polyester was prepared by heating 1682 grams epsilon-caprolactone with 48.8 grams ethylene glycol at 170° C. under nitrogen for forty-eight hours. The resulting polyester was a white, waxy solid having a hydroxyl number of 44.8, a carboxyl number of 1.1 and a molecular weight of about 2370.

126 grams of the copolyester were mixed with 126 grams of the polyester and the blend was reacted at 130° C. with 42.7 grams of 3,3'-dimethyl-4,4'-biphenylene diisocyanate. Thereafter, with the reactants at 130° C., 4.0 grams ethanolamine were added and the mixture was stirred until an elastomeric gum stock was obtained. The gum stock was milled into a thin sheet on a rubber mill and showed no tendency to harden on standing.

7% by weight of 3,3'-dimethyl-4,4'-biphenylene diisocyanate was admixed with a portion of this gum stock on a cold rubber mill. The material was then molded into a disc of 0.07" thickness by heating under pressure for fifteen minutes at 160° C. The resulting elastomer exhibited the following physical properties:

Tensile strength, p.s.i. _____ 2175.
Elongation at break, percent _____ 435.
Load at 300% elongation, p.s.i. _____ 1190.
Brittle temperature, ° C. _____ below −74.
Hardness _____ 65.

EXAMPLE 10

A copolyester was prepared by heating 405 grams epsilon-caprolactone and 195 grams of a mixture of methyl-epsilon-caprolactones with 39.9 grams meta-amino-alpha-methylbenzyl alcohol in the presence of 0.3 gram dibutyltin oxide at 170° C. under nitrogen for twenty hours. The resulting copolyester was a yellow, viscous liquid having a hydroxyl number of 47.3, a carboxyl number of 1.3 and a molecular weight of about 2250.

250 grams of this copolyester were reacted with 44.2 grams 3,3'-dimethyl-4,4'-biphenylene diisocyanate at 130° C. Thereafter, with the reactants at 130° C., 4.1 grams ethanolamine were added and the mixture was stirred until an elastomeric gum stock was obtained. This product was rolled out into a thin sheet on a rubber mill and showed no tendency to harden on standing.

To two portions of this gum stock, 5% and 7% by weight of 3,3'-dimethyl-4,4'-biphenylene diisocyanate were added on a cold rubber mill. The resulting mixtures were then molded into discs of 0.07" thickness by heating under pressure for fifteen minutes at 160° C. The cured elastomers possessed the following physical properties:

| Diisocyanate, Percent | 5 | 7 |
|---|---|---|
| Tensile Strength, p.s.i. | 2,408 | 2,586 |
| Elongation, Percent | 491 | 425 |
| Load at 300% Elongation, p.s.i. | 990 | 1,350 |
| Brittle Temperature, ° C. | below −74 | below −74 |
| Hardness | 60 | 60 |

EXAMPLE 11

A copolyester was prepared by heating 391 grams epsilon-caprolactone and 209 grams of a mixture of dimethyl-epsilon-caprolactones (obtained from a xylenol fraction boiling at 212.5–219° C.) with 17.1 grams ethanolamine in the presence of 0.3 gram dibutyltin oxide at 170° C. under nitrogen for twenty-two hours. The resulting copolyester was a yellow, viscouse liquid having a hydroxyl number of 57.6, a carboxyl number of 2.2 and a molecular weight of about 1810.

0.3 gram of acetyl chloride was added at 100° C. to 250 grams of this copolyester to slow down the ensuing reaction with the isocyanate. The copolyester was then heated to 130° C. and 54.8 grams of 3,3'-dimethyl-4,4'-biphenylene diisocyanate were added. Thereafter, with the reactants at 130° C., 5.1 grams ethanolamine were added and the mixture was stirred until an elastomeric gum stock was obtained. The gum stock was milled into a thin sheet on a rubber mill and showed no tendency to harden on standing.

7% by weight of 3,3'-dimethyl-4,4'-biphenylene diisocyanate was admixed with a portion of this gum stock on a cold rubber mill. The material was then molded into a disc of 0.07" thickness by heating under pressure for fifteen minutes at 160° C. The resulting elastomer exhibited the following physical properties:

Tensile strength, p.s.i. _____ 2175
Elongation at break, percent _____ 480
Load at 300% elongation, p.s.i. _____ 1125
Brittle temperature, ° C. _____ −60
Hardness _____ 63

EXAMPLE 12

A copolyester was prepared by heating 675 grams epsilon-caprolactone and 325 grams of a mixture of methyl-epsilon-caprolactones (obtained from a mixture of ortho-, meta- and para-cresols) with 29 grams ethylene glycol in the presence of 0.5 gram dibutyltin oxide at 170° C. under nitrogen for seventeen hours. The resulting copolyester was a colorless, viscous liquid having a hydroxyl number of 48.6, a carboxyl number of 1 and a molecular weight of about 2200.

250 grams of this copolyester were reacted with 44.6 grams of 3,3'-dimethyl-4,4'-biphenylene diisocyanate at 115–130° C. Thereafter, with the reactants at 120° C., 7.85 grams quinitol were added and the mixture was stirred until an elastomeric gum stock was obtained. This product was rolled out into a thin sheet on a rubber mill and showed no tendency to harden.

To two portions of this gum stock, 5% and 7% by weight of 3,3'-dimethyl-4,4'-biphenylene diisocyanate were added on a rubber mill. The resulting materials were then molded into discs of 0.07" thickness by heating under pressure for fifteen minutes at 160° C. The cured elastomers possessed the following physical properties:

| Diisocyanate, Percent | 5 | 7 |
|---|---|---|
| Tensile Strength, p.s.i | 1,590 | 1,700 |
| Elongation, Percent | 380 | 340 |
| Load at 300% Elongation, p.s.i | 950 | 1,400 |
| Brittle Temperature, ° C | below —75 | below —75 |
| Hardness | 63 | 64 |

EXAMPLE 13

250 grams of the copolyester described in Example 12 were reacted with 44.6 grams of 3,3'-dimethyl-4,4'-biphenylene diisocyanate at 115–130° C. Thereafter, with the reactants at 120° C., 6.1 grams of 1,4-butanediol were added and the mixture was stirred until an elastomeric gum stock was obtained. This product, after processing on a rubber mill, showed no tendency to harden on standing.

To two portions of this gum stock, 5% and 7% by weight of 3,3'-dimethyl-4,4'-biphenylene diisocyanate were added on a rubber mill. The resulting materials were then molded into discs of 0.07" thickness by heating under pressure for fifteen minutes at 160° C. The cured elastomers possessed the following physical properties:

| Diisocyanate, Percent | 5 | 7 |
|---|---|---|
| Tensile Strength, p.s.i | 2,375 | 2,460 |
| Elongation, Percent | 585 | 515 |
| Load at 300% Elongation, p.s.i | 760 | 1,000 |
| Brittle Temperature, ° C | below —75 | below —75 |
| Hardness | 70 | 76 |

EXAMPLE 14

250 grams of the copolyester described in Example 12 were reacted with 44.6 grams of 3,3'-dimethyl-4,4'-biphenylene diisocyanate at 115–130° C. Thereafter, with the reactants at 120° C., 13.4 grams of 4,4'-methylenedianiline were added and the mixture was stirred until an elastomeric gum stock was obtained. This product, after processing on a rubber mill, showed no tendency to harden on standing.

To two portions of this gum stock, 5% and 7% by weight of 3,3'-dimethyl-4,4'-biphenylene diisocyanate were added on a rubber mill. The resulting materials were then molded into discs of 0.07" thickness by heating under pressure for fifteen minutes at 160° C. The cured elastomers possessed the following physical properties:

| Diisocyanate, Percent | 5 | 7 |
|---|---|---|
| Tensile Strength, p.s.i | 3,240 | 3,310 |
| Elongation, Percent | 530 | 440 |
| Load at 300% Elongation, p.s.i | 1,520 | 1,975 |
| Brittle Temperature, ° C | —60 | —60 |
| Hardness | 75 | 77 |

EXAMPLE 15

200 grams of the copolyester described in Example 12 were reacted at 115–130° C. with 35.9 grams of 3,3'-dimethyl-4,4'-biphenylene diisocyanate. Thereafter, with the reactants at 120° C., 7.5 grams of meta-amino-alpha-methylbenzyl alcohol were added and the mixture was stirred until an elastomeric gum stock was obtained. The gum stock was milled into a thin sheet on a rubber mill and showed no tendency to harden on standing.

7% by weight of 3,3'-dimethyl-4,4'-biphenylene diisocyanate was admixed with a portion of this gum stock on a rubber mill. The material was then molded into a disc of 0.07" thickness by heating under pressure for fifteen minutes at 160° C. The cured elastomer exhibited the following physical properties:

Tensile strength, p.s.i _____ 3608
Elongation at break, percent _____ 515
Load at 300% elongation, p.s.i _____ 1200
Brittle temperature, ° C _____ —70
Hardness _____ 68

EXAMPLE 16

A copolyester was prepared by heating 76.9 grams of zeta-enantholactone and 68.5 grams of epsilon-caprolactone with 4.09 grams of ethylene glycol at 170° C. under nitrogen for three hours. The resulting copolyester was a white, waxy solid having a hydroxyl number of 45.7 and a carboxyl number of 1.

110 grams of this copolyester were reacted at 120–132° C. with 18.5 grams of 3,3'-dimethyl-4,4'-biphenylene diisocyanate. Thereafter, with the reactants at 125° C., 1.75 grams of ethanolamine were added and the mixture was stirred until an elastomeric gum stock was obtained.

5% by weight of 3,3'-dimethyl-4,4'-biphenylene diisocyanate was admixed with a portion of this gum stock on a cold rubber mill. The material was then molded into a disc of 0.07" thickness by heating under pressure for fifteen minutes at 160° C. The cured elastomer exhibited the following physical properties:

Tensile strength, p.s.i _____ 690
Elongation at break, percent _____ 350
Load at 300% elongation, p.s.i _____ 625
Brittle temperature, ° C _____ —64
Hardness _____ 55

EXAMPLE 17

A copolyester was prepared by heating 65 grams of zeta-enantholactone and 65 grams of a mixture of methyl-epsilon-caprolactones with 3.77 grams of ethylene glycol in the presence of dibutyltin oxide at 170° C. under a slight stream of nitrogen for nineteen hours. The resulting copolyester was a yellow, viscous liquid having a hydroxyl number of 46.8 and a carboxyl number of 1.3.

96 grams of this copolyester were reacted with 16.8 grams of 3,3'-dimethyl-4,4'-biphenylene diisocyanate at 120–135° C. Thereafter, with the reactants at 120° C., 1.6 grams of ethanolamine were added and the mixture was stirred until an elastomeric gum stock was obtained. This gum stock showed no tendency to harden on standing.

7% by weight of 3,3'-dimethyl-4,4'-biphenylene diisocyanate was admixed with a portion of this gum stock on a rubber mill. The material was then molded into a disc of 0.07" thickness by heating under pressure for fifteen minutes at 160° C. The cured elastomer exhibited the following physical properties:

Tensile strength, p.s.i _____ 1750
Elongation at break, percent _____ 580
Load at 300% elongation, p.s.i _____ 900
Brittle temperature, ° C _____ —70
Hardness _____ 69

EXAMPLE 18

A polyester was prepared by heating 182.2 grams of gamma-methyl-epsilon-caprolactone with 5.44 grams of ethylene glycol in the presence of 0.12 gram phosphoric acid (85%) at 120° C. under nitrogen for 10½ hours. The resulting polyester had a hydroxyl number of 46 and a carboxyl number of 1.4.

100 grams of this polyester were reacted with 17.45 grams of 3,3'-dimethyl-4,4'-biphenylene diisocyanate at 117–135° C. for twenty minutes. 1.61 grams of ethanolamine were added and the mixture was stirred for another twenty minutes at the same temperature. An elastomeric gum stock was thus obtained.

10% by weight of 3,3'-dimethyl-4,4'-biphenylene diisocyanate, 0.9% by weight of ethanolamine and 0.7% by weight of N,N'-dimethylbenzlamine catalyst were admixed with a portion of this gum stock on a cold rubber mill. The material was then molded into a disc of 0.07" thickness by heating under pressure for fifteen minutes at 160° C. The cured elastomer exhibited the following physical properties:

| | |
|---|---|
| Tensile strength, p.s.i. | 2900 |
| Elongation at break, percent | 635 |
| Load at 300% elongation, p.s.i. | 1000 |
| Brittle temperature, ° C. | —60 |
| Hardness | 57 |

EXAMPLE 19

A copolyester was prepared by heating 114 grams of epsilon-caprolactone and 156 grams of a mixture of trimethyl-epsilon-caprolactones with 8.36 grams of ethylene glycol in the presence of 0.21 gram sulfuric acid (98%) at 120° C. for 2.75 hours under nitrogen. Upon subjecting the reaction product to a vacuum of 2 mm. and heating to 186° C., twenty-four grams of trimethyl-epsilon-caprolactones were recovered. The remaining copolyester had a hydroxyl number of 50.2 and a carboxyl number of 1.9. Ninety grams of this copolyester were reacted with 0.38 gram of 2-methyl 5-ethyl pyridine to neutralize the acid catalyst and with 17.25 grams of 3,3'-dimethyl-4,4'-biphenylene diisocyanate at 130° C. for thirty-five minutes. 1.59 grams of ethanolamine were then added and the mixture was stirred for fifteen minutes, whereby an elastomeric gum stock was obtained.

5% by weight of 3,3'-dimethyl-4,4'-biphenylene diisocyanate and 0.5% by weight of ethanolamine were added to a portion of this gum stock on a cold rubber mill. The material was then molded into a disc of 0.07" thickness by heating under pressure for fifteen minutes at 160° C. The cured elastomer exhibited the following physical properties:

| | |
|---|---|
| Tensile strength, p.s.i. | 2700 |
| Elongation at break, percent | 700 |
| Load at 300% elongation, p.s.i. | 740 |
| Brittle temperature, ° C. | —60 |
| Hardness | 61 |

In the foregoing examples, the brittle temperatures were measured by the standard ASTM method which involved the use of a methanol-Dry Ice bath. It was found that in many instances this method did not provide low enough temperatures to provide basis for an accurate determination of low brittle temperature. It is believed to be very probable, therefore, that those compositions reported as having a brittle temperature "below" a certain measured value actually have brittle temperatures as low as —80 to —85° C. The hardness values in the examples are the Shore "A" values ordinarily used in this field.

It is to be understood that numerous modifications will occur to those skilled in the art upon reading this description. All such modifications are intended to be included within the scope of the invention as defined in the accompanying claims.

I claim:

1. Method which comprises the steps of
I. reacting a lactone having at least seven carbon atoms, at least six carbon atoms being in the ring, at a temperature between about 50 and 300° C., with an amount of organic bifunctional initiator having two reactive sites selected from the group consisting of alcoholic hydroxyl, primary amino and secondary amino groups sufficient to form a linear polyester having terminal hydroxyl groups, a hydroxyl number between about 40 and 60, and an acid number not in excess of 10;
II. reacting the said linear polyester with a 30 to 60% molar excess of organic diisocyanate at a temperature up to about 300° C. to form a substantially linear polyester-polyurethane diisocyanate; and
III. reacting the said linear polyester-polyurethane diisocyanate with an amount of a polyfunctional compound in excess of that required for reacting with all of the isocyanate groups of the said linear polyester-polyurethane diisocyanate, said polyfunctional compound being selected from the group consisting of water and organic compounds having at least two reactive sites selected from the group consisting of alcoholic hydroxyl, primary amino, secondary amino, and carboxyl groups to form a millable gum product.

2. The method of claim 1 in which the said millable gum product is cured by reacting it, at a temperature of at least about 100° C., with about 3 to 7% by weight of an organic polyisocyanate based on the weight of said gum product.

3. Method which comprises the steps of
I. reacting a mixture of lactones having at least six carbon atoms in the ring, at least one of the lactone ingredients in the mixture having seven carbon atoms, at a temperature between about 50 and 300° C., with an amount of organic bifunctional initiator having two reactive sites selected from the group consisting of alcoholic hydroxyl, primary amino and secondary amino groups sufficient to form a linear copolyester having terminal hydroxyl groups, a hydroxyl number between about 40 and 60, and an acid number not in excess of 10;
II. reacting the said linear copolyester with a 30 to 60% molar excess of organic diisocyanate at a temperature up to about 300° C. to form a substantially linear polyester-polyurethane diisocyanate; and
III. reacting the said linear polyester-polyurethane diisocyanate with an amount of a polyfunctional compound in excess of that required for reacting with all of the isocyanate groups of the said linear polyester-polyurethane diisocyanate, said polyfunctional compound being selected from the group consisting of water and organic compounds having at least two reactive sites selected from the group consisting of alcoholic hydroxyl, primary amino, secondary amino, and carboxyl groups to form a millable gum product.

4. The method of claim 3 in which the said millable gum product is cured by reacting it, at a temperature of at least about 100° C., with about 3 to 7% by weight of an organic polyisocyanate based on the weight of said gum product.

5. Method which comprises the steps of
I. reacting an alkyl-substituted epsilon-caprolactone, under substantially anhydrous conditions and at a temperature between about 120 and about 200° C., with an amount of organic bifunctional initiator having two reactive sites selected from the group consisting of alcoholic hydroxyl, primary amino and secondary amino groups sufficient to form a substantially anhydrous linear polyester having terminal hydroxyl groups, a hydroxyl number between about 40 and 60, and an acid number not in excess of 10;
II. reacting the said linear polyester with a 30 to 60% molar excess of an organic diisocyanate at a temperature between about 100 and about 150° C. to form a substantially linear polyester-polyurethane diisocyanate; and
III. reacting the said linear polyester-polyurethane diisocyanate with an amount of a polyfunctional compound in 1 to 20% excess of that required for reacting with all of the isocyanate groups of the said linear polyester-polyurethane diisocyanate, said polyfunctional compound being selected from the group consisting of water and organic compounds having at least two reactive sites selected from the group consisting of alcoholic hydroxyl, primary amino, secondary amino, and carboxyl groups at a temperature between about 100 and about 150° C. to form a millable gum product.

6. The method of claim 5 in which the said millable gum product is cured by reacting it, at a temperature between about 140 and 160° C., with about 3 to 7% by weight of an organic polyisocyanate based on the weight of said gum product.

7. Method which comprises the steps of
I. reacting a mixture of epsilon-caprolactones, at least one of said lactones having an alkyl substituent, under substantially anhydrous conditions and at a temperature between about 120 and about 200° C., with an amount of organic bifunctional initiator having two reactive sites selected from the group consisting of alcoholic hydroxyl, primary amino and secondary amino groups sufficient to form a substantially anhydrous linear copolyester having terminal hydroxyl groups, a hydroxyl number between about 40 and 60, and an acid number not in excess of 10;

II. reacting the said linear copolyester with a 30 to 60% molar excess of an organic diisocyanate at a temperature between about 100 and about 150° C. to form a substantially linear polyester-polyurethane diisocyanate; and III. reacting the said linear polyester-polyurethane diisocyanate with an amount of a polyfunctional compound in 1 to 20% excess of that required for reacting with all of the isocyanate groups of the said linear polyester-polyurethane diisocyanate, said polyfunctional compound being selected from the group consisting of water and organic compounds having at least two reactive sites selected from the group consisting of alcoholic hydroxyl, primary amino, secondary amino, and carboxyl groups at a temperature between about 100 and about 150° C. to form a millable gum product.

8. The method of claim 7 in which the said millable gum product is cured by reacting it, at a temperature of at least about 100° C., with about 3 to 7% by weight of an organic polyisocyanate based on the weight of said gum product.

9. Method for forming a millable gum product which comprises reacting (1) a linear polyester prepared by reacting a lactone having at least seven carbon atoms, at least six carbon atoms being in the lactone ring, at a temperature between about 50 and 300° C., with an amount of organic bifunctional initiator having two reactive sites selected from the group consisting of alcoholic hydroxyl, primary amino and secondary amino groups, said linear polyester having terminal hydroxyl groups, a hydroxyl number between about 16 and 374, and an acid number not in excess of 10, (2) an organic diisocyanate, and (3) a polyfunctional reactant selected from the group consisting of water and organic compounds having at least two reactive sites selected from the group consisting of alcoholic hydroxyl, primary amino, secondary amino and carboxyl groups, the amount of said organic diisocyanate being so selected as to provide a 30 to 60% molar excess over the amount required to react with said linear polyester, said millable gum product containing substantially no free isocyanate groups.

10. Method for forming a polyurethane resin which comprises reacting (1) a linear polyester prepared by reacting an alkyl-substituted lactone and an unsubstituted lactone, said lactones having at least six carbon atoms in the lactone ring, at a temperature between about 50 and 300° C., with an amount of organic bifunctional initiator having two reactive sites selected from the group consisting of alcoholic hydroxyl, primary amino and secondary amino groups, said linear copolyester having terminal hydroxyl groups, a hydroxyl number betwen about 40 and 60, and an acid number not in excess of 10, (2) an organic diisocyanate, and (3) a polyfunctional reactant selected from the group consisting of water and organic compounds having at least two reactive sites selected from the group consisting of alcoholic hydroxyl, primary amino, secondary amino, and carboxyl groups to form a millable gum product containing substantially no free isocyanate groups, the amount of said organic diisocyanate being so selected as to provide a 30 to 60% molar excess over the amount required to react with said linear polyester, and curing the said millable gum product by reacting it, at a temperature of at least about 100° C., with about 3 to 7% by weight of an organic polyisocyanate based on the weight of said gum product.

11. A product prepared as defined in claim 1.
12. A product prepared as defined in claim 2.
13. A product prepared as defined in claim 5.
14. A product prepared as defined in claim 6.
15. A product prepared as defined in claim 7.
16. A product prepared as defined in claim 8.
17. A product prepared as defined in claim 9.
18. A product prepared as defined in claim 10.

References Cited in the file of this patent

UNITED STATES PATENTS

| 2,149,678 | Hovey et al. | Mar. 7, 1939 |
| 2,153,801 | Hovey et al. | Apr. 11, 1939 |
| 2,389,628 | Martin | Nov. 27, 1945 |
| 2,432,148 | Furness et al. | Dec. 9, 1947 |
| 2,621,166 | Schmidt et al. | Dec. 9, 1952 |
| 2,650,212 | Windemuth et al. | Aug. 25, 1953 |
| 2,729,618 | Muller et al. | Jan. 3, 1956 |

FOREIGN PATENTS

| 956,245 | France | July 25, 1949 |

OTHER REFERENCES

Ser. No. 397,741, Schlack (A.P.C.), published Apr. 20, 1943.